No. 869,843. PATENTED OCT. 29, 1907.
G. B. HOLMES & A. D. ALLEN.
TROLLEY HEAD FOR ELECTRIC TRACTION.
APPLICATION FILED AUG. 7, 1907.
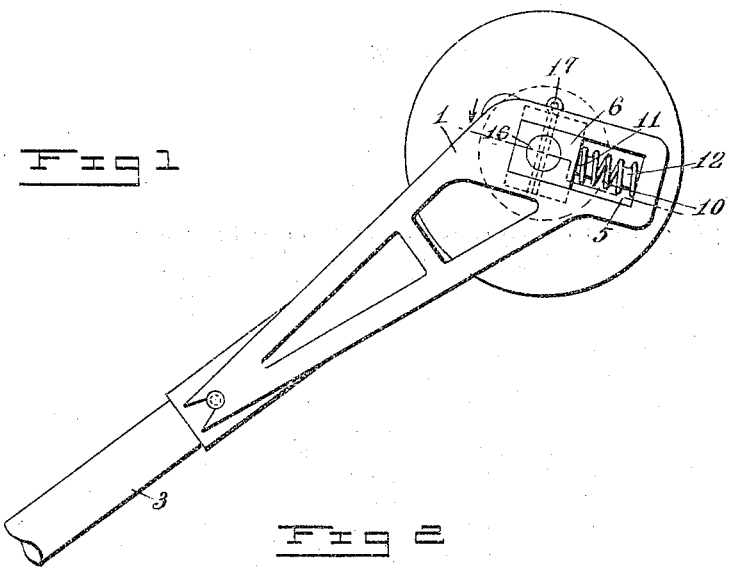
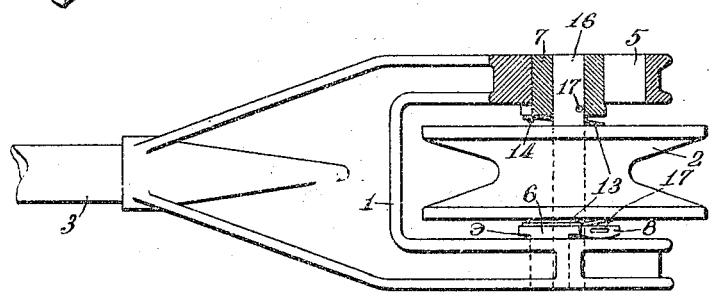
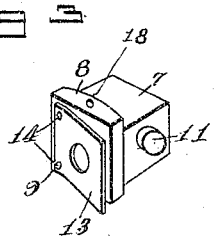
Inventor
Garnet Bowen Holmes
Arthur Dunscombe Allen

UNITED STATES PATENT OFFICE.

GARNET BOWEN HOLMES AND ARTHUR DUNSCOMBE ALLEN, OF WELLINGTON, NEW ZEALAND.

TROLLEY-HEAD FOR ELECTRIC TRACTION.

No. 869,843.　　　　Specification of Letters Patent.　　　　Patented Oct. 29, 1907.

Application filed August 7, 1907. Serial No. 387,485.

*To all whom it may concern:*

Be it known that we, GARNET BOWEN HOLMES and ARTHUR DUNSCOMBE ALLEN, subjects of His Majesty the King of Great Britain and Ireland, both residing at Wellington, New Zealand, have invented new and useful Improvements in Trolley-Heads for Electric Traction, of which the following is a specification.

Our invention relates to improvements in trolley heads, and it consists in the constructions, combinations and arrangements herein described and claimed.

The object of our invention is to provide an improved trolley head of simple and durable construction, which will automatically accommodate itself to all irregularities and curvatures of the trolley wire for maintaining an efficient contact with the latter under all practical conditions.

In the accompanying drawings, forming a part of this application and in which similar reference numerals indicate corresponding parts in the several views—
Figure 1 is a side elevation, illustrating one embodiment of our invention; Fig. 2 is a plan view, partly broken away, of the construction shown in Fig. 1; and Fig. 3 is a perspective view of a preferred form of one of the bearing blocks.

Referring to the drawings, 1 indicates a yoke provided with any suitable extension for securing it in the usual way to a trolley pole 3; the respective jaws of the yoke being provided with slots 5 inclined downwardly toward the rear.

Bearing blocks 7 are slidably mounted in the slots 5 and provided with flanges 8 and 9 having curved faces 18 for engaging the walls of said yoke; springs 10 being supported on studs 11 and 12 on the bearing blocks and yoke jaws, respectively, for normally maintaining said bearing blocks in the upper portions of the inclined slots 5. The springs 10 thus constitute yielding buffers for maintaining the trolley wheel in contact with the trolley wire, and preventing shocks due to irregularities in the latter.

A spindle 16 is suitably secured in the bearing blocks, as by split pins 17, and rotatably supports a trolley wheel 2. Springs 13 are interposed between said trolley wheel and bearings for yieldingly positioning the wheel on its spindle; said springs being shown secured to the bearings by rivets 14.

The curved faces 18 enable the bearing blocks and spindle 16 to swing as a whole in the yoke to permit automatic swing of the trolley wheel for adjustment of the latter to curvatures of the trolley wire. Such ad-
justing swing of the trolley wheel will compress one or the other of the springs 10; said springs constituting yielding means for automatically returning the trolley wheel to its normal straight position. The rounded studs 11 and 12, extending within the respective ends of the springs 10, enable said springs to accommodate themselves to the swing of the bearing blocks and spindle, and insure efficient action of the springs 10 in all positions of said bearing blocks.

In previous constructions, it has been usual to provide the trolley wheel with a contact groove of considerably greater width than that necessary to receive the trolley wire, in order to prevent the trolley wheel slipping from position when traveling along curved portions of said wire. In these previous constructions, it has been found that the bottom of such widened groove in the trolley wheel is irregularly worn by the trolley wire to produce ridges in the bottom of said groove; thereby causing abnormal sparking and an inefficient contact between the trolley wheel and wire. By our invention, it is practical to provide the trolley wheel with a V-shaped groove having the bottom formed of such width that it will be subjected to uniform wear throughout by contact with the trolley wire.

We have illustrated and described preferred and satisfactory constructions; but, obviously, changes could be made within the scope of our invention.

Having thus described our invention, what we claim as new therein and desire to secure by Letters Patent is:—

1. In a trolley head, the combination of a yoke provided with slots, bearing blocks slidably mounted in said slots, a spindle secured to said bearing blocks, a trolley wheel carried by said spindle, curved flanges on said blocks engaging the walls of said yoke to permit swing of the blocks and spindle, springs for automatically returning said blocks and spindle to their normal straight position, and means on the yoke and blocks for engaging said springs to permit accommodation of the latter to the swing of said blocks, substantially as described.

2. In a trolley head, the combination of a yoke provided with inclined slots, bearing blocks slidably mounted in said slots, a spindle secured to said bearing blocks, a trolley wheel carried by said spindle, curved flanges on said blocks engaging the walls of said yoke to permit swing of the blocks and spindle, and springs for shifting said bearing blocks against the upper ends of said inclined slots and yieldingly maintaining said blocks and spindle in their normal straight position in the several shifted positions of the latter, substantially as described.

3. In a trolley head, the combination of a yoke provided with slots, bearing blocks slidably mounted in said slots, a spindle secured to said bearing blocks, a trolley wheel carried by said spindle, curved flanges on said blocks engaging the walls of said yoke to permit swing of the blocks and spindle, springs for automatically returning said blocks and spindle to their normal straight position, means on the yoke and blocks for engaging said springs to permit accommodation of the latter to the swing of said blocks, and flat springs secured to said bearing blocks and engaging the adjacent sides of the trolley wheel for yieldingly positioning the latter on its spindle, said flat springs being provided with openings for permitting passage of its spindle therethrough, substantially as described.

In testimony whereof we have signed our names to this specification in the presence of two witnesses.

GARNET BOWEN HOLMES.
ARTHUR DUNSCOMBE ALLEN.

Witnesses:
ERNEST SMITH BALDWIN,
I. I. WATSON.